US012809751B2

(12) United States Patent
Park et al.

(10) Patent No.: US 12,809,751 B2
(45) Date of Patent: Nov. 24, 2026

(54) SYSTEM ON CHIP AND ELECTRONIC DEVICE COMPRISING THE SAME

(71) Applicant: SAMSUNG ELECTRONICS CO., LTD., Suwon-si (KR)

(72) Inventors: Bo Youn Park, Suwon-si (KR); Chung Woo Park, Suwon-si (KR); Chang Yong Park, Suwon-si (KR); Gang Li, Suwon-si (KR); Lei Wang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 18/738,220

(22) Filed: Jun. 10, 2024

(65) Prior Publication Data

US 2025/0103468 A1 Mar. 27, 2025

(30) Foreign Application Priority Data

Sep. 27, 2023 (KR) ........................ 10-2023-0130765

(51) Int. Cl.
*G06F 11/362* (2025.01)
*G06F 11/07* (2006.01)

(52) U.S. Cl.
CPC ...... *G06F 11/3644* (2013.01); *G06F 11/0757* (2013.01); *G06F 11/0772* (2013.01)

(58) Field of Classification Search
CPC ............. G06F 11/0757; G06F 11/0772; G06F 11/3644
USPC .................................................. 717/124–133
See application file for complete search history.

(56) References Cited

U.S. PATENT DOCUMENTS

| | | | | |
|---|---|---|---|---|
| 7,900,033 | B2 | 3/2011 | Rothman et al. | |
| 9,081,602 | B1 * | 7/2015 | Omelyanchuk | G06F 11/3644 |
| 9,141,512 | B2 * | 9/2015 | Eliaš | G06F 11/362 |
| 11,010,280 | B1 | 5/2021 | Stupachenko et al. | |
| 11,169,838 | B2 | 11/2021 | Laplace et al. | |
| 11,182,186 | B2 | 11/2021 | Asaro et al. | |
| 11,436,149 | B2 * | 9/2022 | Harar | G06F 11/3433 |
| 11,544,130 | B2 * | 1/2023 | Bollu | G06F 11/0712 |
| 11,934,883 | B2 * | 3/2024 | Lippert | G06F 9/5027 |

(Continued)

FOREIGN PATENT DOCUMENTS

KR 19940012129 6/1994

OTHER PUBLICATIONS

Ranadive et al., "Performance Implications of Virtualizing Multicore Cluster Machine", ACM, 2008, 8 pages. (Year: 2008).*

(Continued)

*Primary Examiner* — Ted T. Vo
(74) *Attorney, Agent, or Firm* — Fish & Richardson P.C.

(57) ABSTRACT

A system on chip comprises a first core cluster including a plurality of cores and executing a first virtual machine including a first debug client, and a second core cluster including a plurality of cores and executing a second virtual machine including a second debug client. A first core of the first core cluster and a second core of the second cluster execute a hypervisor at a first exception level and detect unusual operation cores in each cluster. The first core and second core execute the debug server at the first exception level and call the debug clients. The first core and second core execute the debug clients at a second exception level and output stack information of the unusual operation cores.

20 Claims, 11 Drawing Sheets

(56) References Cited

U.S. PATENT DOCUMENTS

| | | | |
|---|---|---|---|
| 2011/0225459 | A1 | 9/2011 | Fahrig et al. |
| 2018/0113764 | A1 | 4/2018 | Bhandari et al. |
| 2019/0243673 | A1 | 8/2019 | Franciosi et al. |

OTHER PUBLICATIONS

Vanderleest et al., "MPSoC hypervisor: The safe & secure future of avionics", 2015, IEEE, 14 pages. (Year: 2015).*

* cited by examiner

SYSTEM ON CHIP AND ELECTRONIC DEVICE COMPRISING THE SAME

CROSS-REFERENCE TO RELATED APPLICATIONS

This application claims priority to Korean Patent Application No. 10-2023-0130765, filed in the Korean Intellectual Property Office on Sep. 27, 2023, the disclosure of which is incorporated by reference herein in its entirety.

BACKGROUND

A system on chip (SoC) includes a core for controlling connected semiconductor devices. The core of the system on chip may control the operation of a semiconductor device by performing a computation and transmitting and receiving signals. In some cases, the system on chip may include a plurality of cores, and the plurality of cores may perform different functions from each other.

A debug subsystem may be included in the system on chip to identify the cause of unusual operation of the cores included in the system on chip. However, because the debug subsystem requires a separate core or processor, there is a problem of an increase in costs of the system on chip.

SUMMARY

In general, in some aspects, the present disclosure is directed toward a system on chip and an electronic device including the same, in which the system is capable of performing efficient debugging in a virtualized environment without a separate debug subsystem. By eliminating the use of a separate debug subsystem for performing debugging operations, it is possible, in some implementations to produce the system on chip with reduced costs.

In general, according to some aspects, the present disclosure is directed to a system on chip that comprises: a first core cluster including a plurality of cores and executing a first virtual machine including a first debug client; and a second core cluster including a plurality of cores and executing a second virtual machine including a second debug client. A first core of the first core cluster is configured to execute a hypervisor including a reset driver and a debug server at a first exception level (EL) and detect at least one first unusual operation core among the plurality of cores included in the first core cluster, execute the debug server at the first exception level and call the first debug client, in response to detection of the first unusual operation core, execute the first debug client at a second exception level different from the first exception level and output stack information of the first unusual operation core, and execute the reset driver at the first exception level and reset a system. A second core of the second core cluster is configured to execute the hypervisor at the first exception level and detect at least one second unusual operation core among the plurality of cores included in the second core cluster, execute the debug server at the first exception level and call the second debug client, in response to detection of the second unusual operation core, execute the second debug client at the second exception level and output stack information of the second unusual operation core, and execute the reset driver at the first exception level and reset the system.

According to some aspects of the present disclosure, an electronic device comprises: a memory onto which a first virtual machine including a first debug client, a second virtual machine including a second debug client, and a hypervisor including a reset driver and a debug server are loaded, and a system on chip which includes a first core cluster including a plurality of cores and executing the first virtual machine loaded into the memory, and a second core cluster including a plurality of cores and executing the second virtual machine loaded into the memory, wherein a first core of the first core cluster is configured to execute the hypervisor at a first exception level and detect at least one first unusual operation core among a plurality of cores included in the first core cluster, execute the debug server at the first exception level and call the first debug client, in response to detection of the first unusual operation core, execute the first debug client at a second exception level different from the first exception level and output a GPR (General Purpose Register) value and stack information of the first unusual operation core, and execute the reset driver at the first exception level and reset a system.

According to some aspects of the present disclosure, an electronic device comprises a memory into which a virtual machine including a debug client, and a hypervisor including a reset driver and a debug server are loaded, and a system on a chip which includes a plurality of cores which execute the hypervisor and the virtual machine loaded into the memory, wherein a first core among the plurality of cores is configured to execute the hypervisor at a first exception level, and set up the reset driver and debug server, execute the virtual machine at a second exception level different from the first exception level, and set up the debug client, execute the hypervisor at the first exception level, and detect at least one unusual operation core among the plurality of cores, execute the debug server at the first exception level and call the first debug client, in response to detection of the first unusual operation core, execute the debug client at the second exception level and output stack information of the unusual operation core, and execute the reset driver at the first exception level and reset a system.

BRIEF DESCRIPTION OF THE DRAWINGS

Example implementations will become more clearly understood from the following detailed description, taken in conjunction with the accompanying drawings.

DETAILED DESCRIPTION

Hereinafter, example implementations will be explained in detail with reference to the accompanying drawings.

Figure 1:
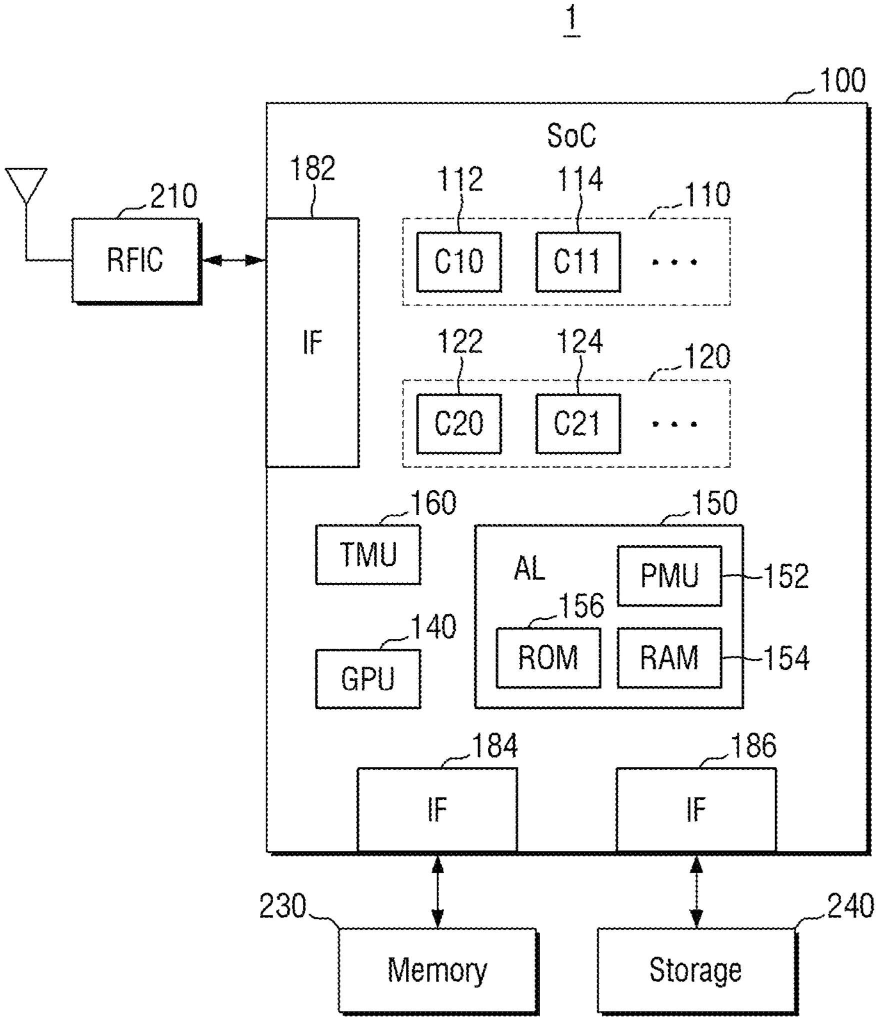
FIG. 1 is a block diagram of an example of an electronic device including a system on chip (SoC) according to some implementations.

FIG. 1 is a block diagram of an example of an electronic device including a system on chip (SoC) according to some implementations. In FIG. 1, the electronic device 1 may include a System on Chip (SoC) 100, an RF circuit 210, a memory device 230, and a storage device 240.

The SoC 100 may include a first core cluster 110, a second core cluster 120, a Graphic Processing Unit (GPU) 140, an alive circuit 150, a temperature management circuit 160, and a plurality of circuit interfaces 182, 184, and 186. In some implementations, the SoC 100 may further include a plurality of additional components. In some implementations, the term "core" may also be referred to as a core circuit.

The first core cluster 110 may include a plurality of cores including a core 112 and a core 114. The second core cluster 120 may include a plurality of cores including a core 122 and a core 124. In some implementations, the core 112, the core 114, the core 122, and the core 124 may be, for example, cores designed according to an ARM v8 architecture. In ARM v8 architecture, the core may execute a program at one of EL0 (Exception Level 0) to EL3. The core may execute the user application program at EL0, and execute the operating system kernel at EL1, and execute the hypervisor at EL2, and execute the low-level firmware at EL3.

In some implementations, the first core cluster 110 may perform a computation that is necessary for the SoC 100 to operate as an application processor (AP) inside the electronic device 1.

The cores 112 and 114 included in the first core cluster 110 may make a first virtual machine (e.g., VM1 of FIG. 4) operate as an AP, by executing a first virtual machine program (e.g., VM1P of FIG. 3) for performing the AP operation.

In some implementations, the second core cluster 120 may perform a computation that is necessary for the SoC 100 to operate as a communication processor (CP) in the electronic device 1.

The cores 122 and 124 included in the second core cluster 120 may make a second virtual machine (e.g., VM2 of FIG. 4) operate as a CP, by executing a second virtual machine program (e.g., VM2P of FIG. 3) for performing the CP operation.

However, in some implementations, and the roles of the first core cluster 110 and the second core cluster 120 may be differently modified and implemented as necessary.

The GPU 140 may perform graphic processing on data. For example, the GPU 140 may process image data to be displayed on the display device of the electronic device 1.

The alive circuit 150 may include a power management unit (circuit) PMU 152, a Random Access Memory (RAM) 154, and a Read Only Memory (ROM) 156.

The PMU 152 may manage power to be supplied to the SoC 100. In some implementations, the PMU 152 may manage power to be provided to the first core cluster 110 and the second core cluster 120.

The RAM 154 and the ROM 156 may be used by the SoC 100 to perform an initialization operation. As will be described below, when the electronic device 1 is initialized, a boot loader is loaded into the ROM 154 using the code stored in the ROM 156, and a core, such as core 112, may execute the boot loader to initialize the SoC 100.

The temperature management unit (circuit) TMU 160 includes a temperature sensor, and may read a temperature value through the temperature sensor.

The SoC 100 may be connected to the RF circuit 210, the memory device 230, and the storage device 240 to control the RF circuit 210, the memory device 230, and the storage device 240.

The RF circuit 210 may receive and process a radio signal from an antenna, or may send the processed signal to the outside through the antenna. The RF circuit 210 may operate in a 3G mode, a 4G mode, a 5G mode, or the like, and may change its operating mode according to a control signal sent from the SoC 100. The RF circuit 210 may be connected to SoC 100 through the interface 182 to transmit and receive signals and data.

The memory device 230 may temporarily store and maintain programs or data necessary to drive the SoC 100. In some implementations, the memory device 230 may be a volatile memory device. For example, although the memory device 230 may include a dynamic random access memory (DRAM), some implementations are not limited thereto. Programs necessary to drive the SoC 100 may be loaded into such a memory device 230. The memory device 230 may be connected to the SoC 100 through the interface 184.

The storage device 240 may store data necessary for driving the electronic device 1 and programs or data necessary for driving the SoC 100. Here, the storage device 240 may include a nonvolatile memory device, such as a NAND flash or a NOR flash. Data stored in the storage device 240 may be loaded into the memory device 230 under control of the SoC 100. The storage device 240 may be connected to the SoC 100 through the interface 186.

Although FIG. 1 shows the first core cluster 110, the second core cluster 120, the GPU 140, the alive circuit 150, and the TMU 160 implemented on a single chip, some implementations are not limited thereto, and in some implementations other chips if may be used as necessary.

The operation of generating a virtual machine in the SoC will be described below with reference to FIGS. 1 to 4.

Figure 2:
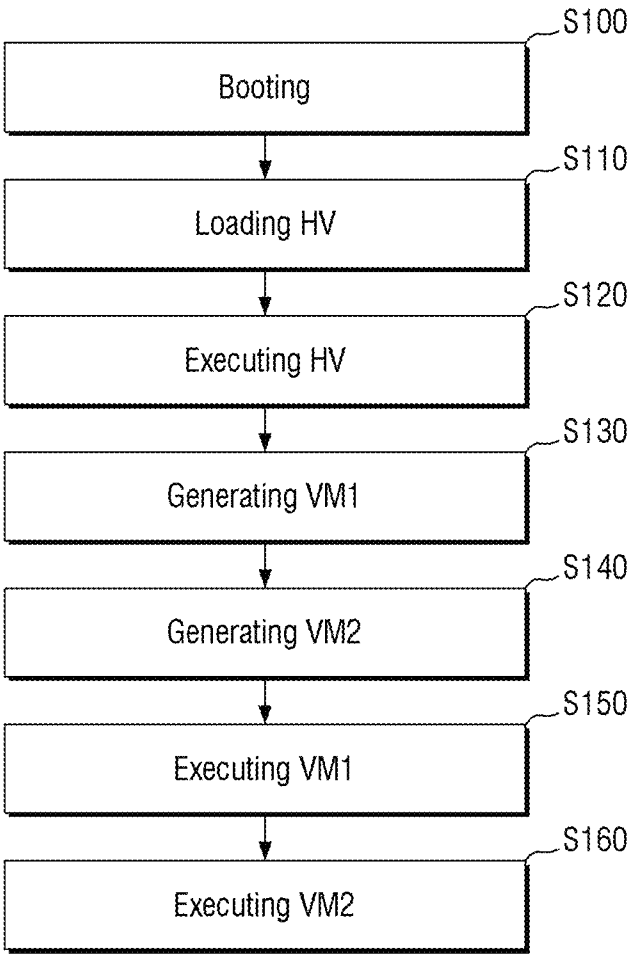
FIG. 2 is a flowchart showing an example of an operation in which a virtual machine is generated on the SoC according to some implementations.
Figure 3:
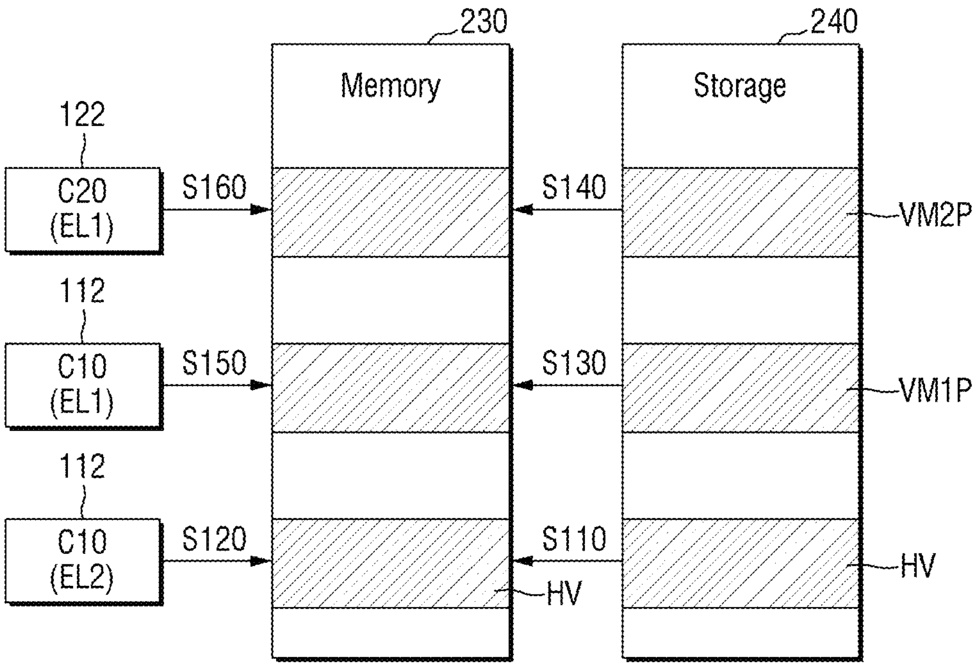
FIGS. 3 and 4 are diagrams for explaining the operation of FIG. 2 according to some implementations.
Figure 4:
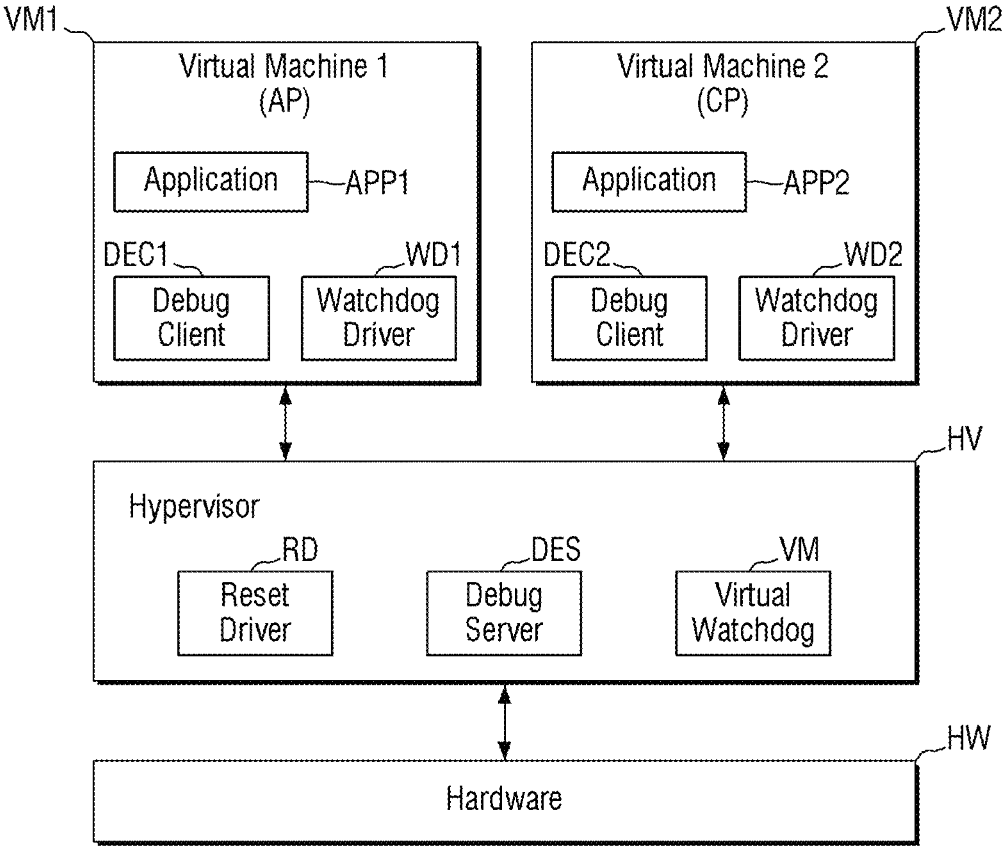

FIG. 2 is a flowchart showing an example of an operation in which the virtual machine is generated on the SoC according to some implementations. FIGS. 3 and 4 are diagrams for explaining the operation of FIG. 2 according to some implementations.

In FIG. 2, an electronic device including the SoC 100 is booted up (S100). Referring to FIG. 1, when the electronic device 1 is booted up, the SoC 100 is powered on, and a boot loader may be loaded from the storage device 240 to the RAM 154 by referring to the code stored in the ROM 156 inside the alive circuit 150. For example, the core 112 may execute the boot loader loaded into the RAM 154 to prepare the memory device 230 for use and perform an initialization operation.

Although an example in which the boot loader is executed by the core 112 will be described below, some implementations are not limited thereto. In some implementations, any one of the core 114, the core 122, and the core 124 may execute the boot loader loaded into the RAM 154.

When the boot loader is executed by the core 112, the core 112 may execute the boot loader at an EL3 (Exception Level 3).

Next, in FIG. 2, a hypervisor HV is loaded (S110). Referring to FIGS. 1 to 4, for example, as the core 112 executes the boot loader, the hypervisor HV stored on the storage device 240 in the form of software may be loaded into the memory device 230. Next, in FIG. 2, the hypervisor HV is executed (S120). Referring to FIGS. 1 to 4, for example, the exception level of the core 112 is changed from EL3 to EL2, and core 112 may execute the hypervisor HV loaded into the memory device 230.

In some implementations, a reset driver circuit RD, a debug server DES, and a virtual watchdog driver circuit VW may be set up in the hypervisor HV. The reset driver circuit RD may reset the system when at least one core among the cores included in the first core cluster 110 and the cores included in the second core cluster 120 is detected as an unusual operation core.

The debug server DES may call debug clients DEC1 and DEC2 of the first and second virtual machines VM1 and VM2 to output the information of the unusual operation core for debugging, when at least one core among the cores included in the first core cluster 110 and the cores included in the second core cluster 120 is detected as the unusual operation core.

Although such information of the unusual operation core may include, for example, stack information (e.g., execution function stack information) of the unusual operation core, General Purpose Register (GPR) value of the unusual operation core, and the like, some implementations are not limited thereto.

In some implementations, the debug server DES may control the core of a hard lock-up state to execute the debug client DEC1 of the first virtual machine VM1 so as to output debugging information of the core in the hard lock-up state, when any of the cores included in the first core cluster 110 is confirmed to be in the hard lock-up state.

Further, the debug server DES may control the core of the hard lock-up state to execute the debug client DEC2 of the second virtual machine VM2 so as to output debugging information of the core in the hard lock-up state, when any of the cores included in the second core cluster 120 is confirmed to be in the hard lock-up state.

Here, when a specific core is in the hard lock-up state, for example, in a situation in which a specific core is stopped without moving to other tasks of the operating system for 10 seconds or more during one task operation of the operating system (e.g., the first and second virtual machines VM1 and VM2), if there is no response even when an interrupt is sent to the core, this may be determined to be a hard lock-up state.

In some implementations, the debug server DES sends the address at which the GPR value of the unusual operation core is stored to the first debug client DEC1 to output the GPR value of the unusual operation core, and may cause the first debug client DEC1 to output the GPR value of the unusual operation core. Also, the debug server DES sends the address at which the GPR value of the unusual operation core is stored to the second debug client DEC2 to output the GPR value of the unusual operation core, and may cause the second debug client DEC2 to output the GPR value of the unusual operation core.

In this implementations, the SoC 100 is not provided with separate debug subsystems for the first core cluster 110 and the second core cluster 120, and the debugging operation may be performed on a plurality of cores included in the first and second core clusters 110 and 120, using the debug server DES of the hypervisor HV and the debug clients DEC1 and DEC2 of the virtual machines VM1 and VM2.

The virtual watchdog driver VW may perform a virtual watchdog operation that checks whether watchdog signals are transmitted from the watchdog drivers WD1 and WD2 of the first and second virtual machines VM1 and VM2 within a predetermined period of time.

If a watchdog timeout occurs in which the watchdog signal is not transmitted from the watchdog drivers WD1 and WD2 of the first and second virtual machines VM1 and VM2 within a predetermined period of time, the virtual watchdog driver VW detects that an unusual operation of a core occurs, and may instruct the debug server DES to call the debug clients DEC1 and DEC2 of the first and second virtual machines VM1 and VM2.

For example, if a watchdog timeout occurs in which the watchdog signal is not transmitted from the watchdog driver WD1 of the first virtual machine VM1 within a predetermined period of time, the virtual watchdog driver VW detects that a problem occurs in the cores included in the first core cluster 110 (cores included in the first virtual machine VM1 domain), and may instruct the debug server DES to call the debug client DEC1 of the first virtual machine VM1.

Furthermore, if a watchdog timeout occurs in which the watchdog signal is not transmitted from the watchdog driver WD2 of the second virtual machine VM2 within a predetermined period of time, the virtual watchdog driver VW may detect that a problem has occurred in the cores included in the second core cluster 120 (cores included in the second virtual machine VM2 domain), and instruct the debug server DES to call the debug client DEC2 of the second virtual machine VM2.

In addition, the hypervisor HV may include hardware drivers for accessing various hardware HW, and the first and second virtual machines VM1 and VM2 may communicate with various hardware HW through the hardware drivers of the hypervisor HV.

Next, In FIG. 2, a first virtual machine is generated (S130). Referring to FIGS. 1 to 4, for example, as the core 112 executes the hypervisor HV, the first virtual machine program VM1P stored in the storage device 240 in the form of software may be loaded into the memory device 230.

Such a first virtual machine program VM1P may include a first Operating System (OS) that drives the first virtual machine, and the first virtual machine VM1 may be driven on the basis of the first OS.

Next, in FIG. 2, a second virtual machine is generated (S140). Referring to FIGS. 1 to 4, for example, as the core 112 executes the hypervisor HV, the second virtual machine program VM2P stored in the storage device 240 in the form of software may be loaded into the memory device 230.

The second virtual machine program VM2P may include a second OS that drives the second virtual machine, and the second virtual machine VM2 may be driven on the basis of the second OS.

In some implementations, the second OS included in the second virtual machine program VM2P may be different from the first OS included in the first virtual machine program VM1P. For example, although the first virtual machine program VM1P may include Linux as an OS, and the second virtual machine program VM2P may include a program other than Linux as the OS, some implementations are not limited thereto.

In some implementations, the first virtual machine program VM1P and the second virtual machine program VM2P may be distinct from each other and independently loaded as shown in the memory device 230. As a result, when the cores 112 and 114 included in the first core cluster 110 are executed at EL1, the first virtual machine program VM1P loaded into the memory device 230 may be executed, but the second virtual machine program VM2P may not be executed.

Furthermore, when the cores 122 and 124 included in the first core cluster 120 are executed at EL1, the second virtual machine program VM2P loaded into the memory device 230 may be executed, but the virtual machine program VM1P may not be executed.

Next, in FIG. 2, the first virtual machine is executed (S150). Referring to FIGS. 1 to 4, for example, the exception level of the core 112 is changed from EL2 to EL1, and the core 112 may execute the first virtual machine program VM1P loaded into the memory device 230. Accordingly, when the first OS included in the first virtual machine program VM1P is executed, and the first virtual machine VM1 executes the function of an application processor AP, functions related to the operation of the application processor may be set up.

As the core 112 executes the first virtual machine program VM1P loaded into the memory device 230, the debug client DEC1 and the watchdog driver WD1 may be set up in the first virtual machine VM1.

The debug client DEC1 may confirm that any one of the plurality of cores included in the first core cluster 110 is in a hard lock-up state, and may send this to the hypervisor HV.

Here, when a specific core is in the hard lock-up state, for example, in a situation in which a specific core is stopped during one task operation of the operating system for more than 10 seconds without moving to other tasks of the operating system, if there is no response even when an interrupts is sent to the core, this may be determined as a hard lock-up state.

The debug client DEC1 may output the stack information of the unusual operation core, the GPR value of the unusual operation core, or the like, in response to a call of the debug server DES of the hypervisor HV. Such information may be output, for example, through a display device, output to a predetermined storage region, and may be used for debugging of the operating core later.

In some implementations, when outputting the GPR value of the unusual operation core, the debug client DEC1 may output the GPR value of the unusual operation core, by referring to the address in which the GPR value of the unusual operation core received from the debug server DES is stored.

The watchdog driver WD1 may periodically transmit the watchdog signal to the virtual watchdog driver VW within a predetermined period of time. When at least one core in the first core cluster 110 operates usually, the watchdog driver WD1 is executed by a usual operation core in the first core cluster 110, and the watchdog signal may be periodically transmitted to the virtual watchdog driver VW.

However, if all the cores in the first core cluster 110 operate unusually, since there is no core that may execute the watchdog driver WD1 in the first core cluster 110, no watchdog signal is transmitted to the virtual watchdog driver WD1 within a predetermined period of time. Accordingly, a watchdog timeout occurs in the virtual watchdog driver VW, and in this case, the virtual watchdog driver VW detects that all cores in the first core cluster 110 are operating unusually, and may instruct the debug server DES to call the debug client DEC1 of the first virtual machine VM1.

After the debug client DEC1 and the watchdog driver WD1 are set up in the first virtual machine VM1, the exception level of the core 112 is changed from EL1 to EL0, and the core 112 may execute various applications APP1 required for operation. In some implementations, such an application APP1 may include a watchdog application that periodically generates and transmits the watchdog signal within a predetermined period of time.

Next, in FIG. 2, the second virtual machine is executed (S160). Referring to FIGS. 1 to 4, for example, the core 122 may execute the second virtual machine program VM2P loaded onto the memory device 230 at EL1. Accordingly, the second OS included in the second virtual machine program VM2P may be executed. As described above, if the first OS included in the first virtual machine program VM1P and the second OS included in the second virtual machine program VM2P are different from each other, the first virtual machine VM1 and the second virtual machine VM2 may operate on different operating systems from each other.

When the second virtual machine VM2 executes the function of a communication processor CP, functions related to the operation of the communication processor may be set up.

As the core 122 executes the second virtual machine program VM2P loaded into the memory device 230, the debug client DEC2 and the watchdog driver WD2 are set up in the second virtual machine VM2.

The debug client DEC2 may confirm that any one of the plurality of cores included in the second core cluster 120 is in a hard lock-up state, and may send this to the hypervisor HV.

The debug client DEC2 may output the stack information of the unusual operation core, the GPR value of the unusual operation core, or the like, in response to a call of the debug server DES of the hypervisor HV. Such types of information may be output, for example, through a display device, or output to a predetermined storage region, and used for debugging of the unusual operation core later.

In some implementations, when outputting the GPR value of the unusual operation core, the debug client DEC2 may output the GPR value of the unusual operation core, by referring to the address in which the GPR value of the unusual operation core received from the debug server DES is stored.

The watchdog driver WD2 may periodically transmit the watchdog signal to the virtual watchdog driver VW within a predetermined period of time. When at least one core in the second core cluster 120 operates usually, the watchdog driver WD2 is executed by a usual operation core in the second core cluster 120, and the watchdog signal may be periodically transmitted to the virtual watchdog driver VW.

However, if all the cores in the second core cluster 120 operate unusually, since there is no core that may execute the watchdog driver WD2 in the second core cluster 120, no watchdog signal is transmitted to the virtual watchdog driver VW within a predetermined period of time. Accordingly, a watchdog timeout occurs in the virtual watchdog driver VW, and in this case, the virtual watchdog driver VW detects that all cores in the second core cluster 120 are operating unusually, and may instruct the debug server DES to call the debug client DEC2 of the second virtual machine VM2.

After the debug client DEC2 and the watchdog driver WD2 are set up in the second virtual machine VM2, the exception level of the core 122 is changed from EL1 to EL0, and the core 122 may execute various applications APP2 necessary for operation. In some implementations, such an application APP2 may include a watchdog application that periodically generates and transmits the watchdog signal within a predetermined period of time.

Figure 5:
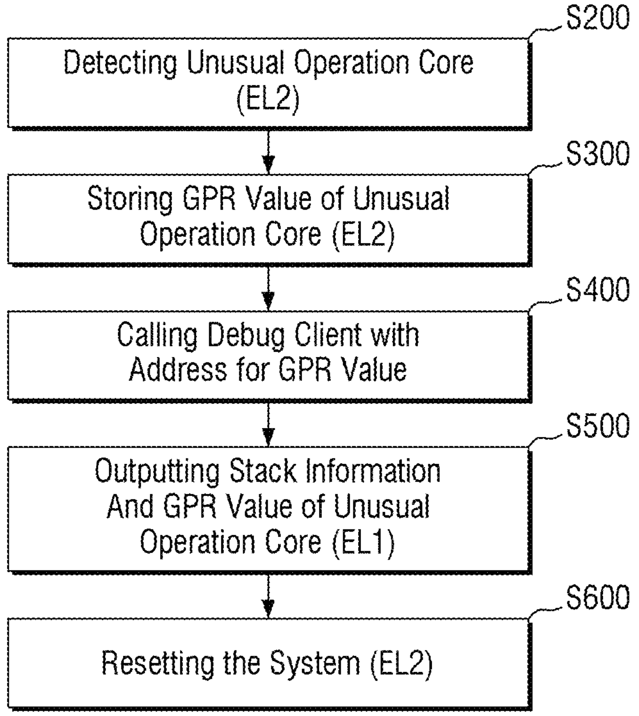
FIG. 5 is a flowchart showing an example of a debugging operation of the SoC according to some implementations.
Figure 6:
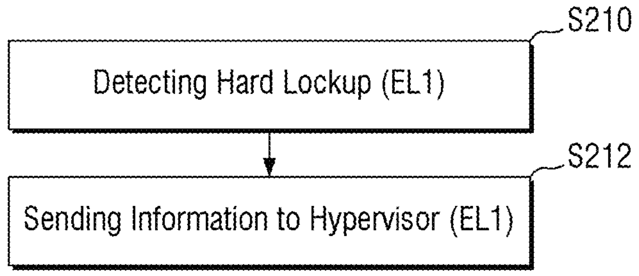
FIGS. 6 and 7 are diagrams for explaining the debugging operation of FIG. 5 according to some implementations.
Figure 7:
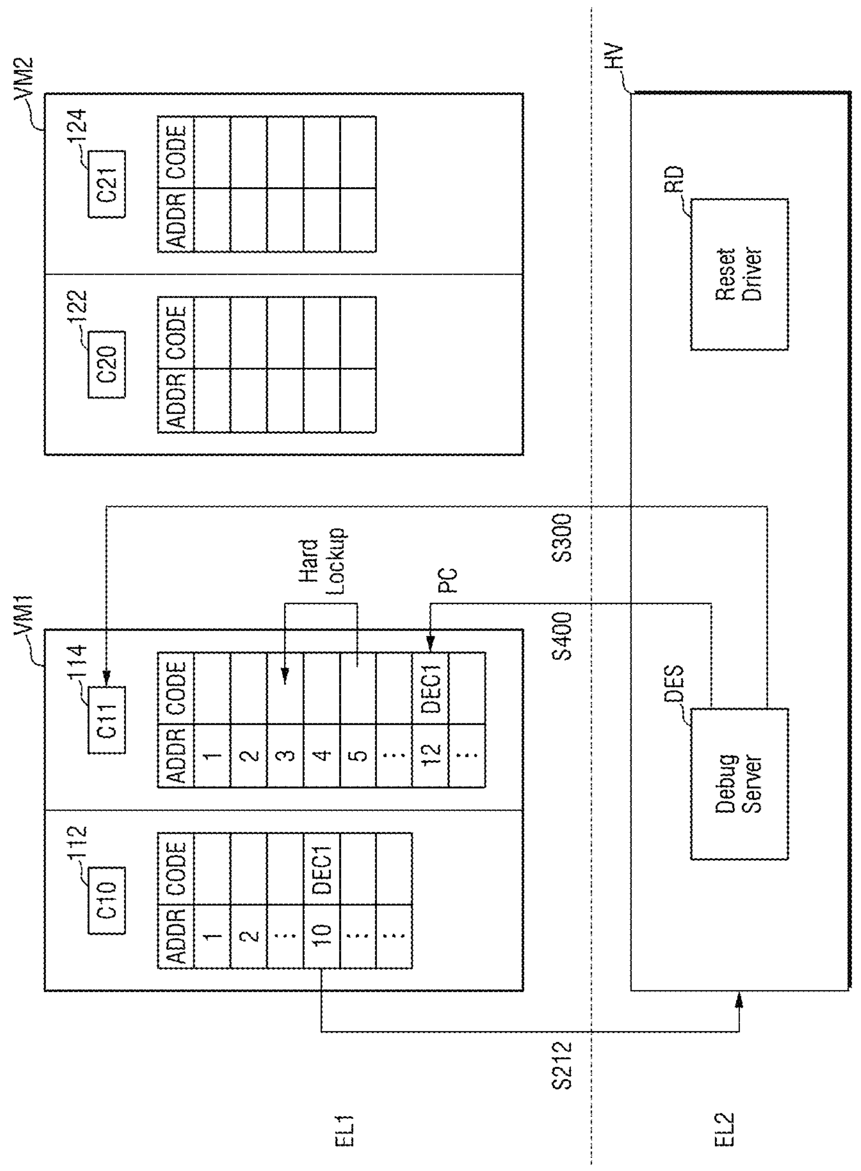

Hereinafter, a debugging operation of the SoC according to some implementations will be described with reference to FIGS. 5 to 10. First, the debugging operation when some cores are in the hard lock-up state will be described with reference to FIGS. 5 to 7. FIG. 5 is a flowchart showing an example of a debugging operation of the SoC according to some implementations. FIGS. 6 and 7 are diagrams for explaining the debugging operation of FIG. 5 according to some implementations.

In FIG. 5, an unusual operation core is detected (S200).

Regarding the unusual operation core, in some cases, some cores in the core cluster may operate unusually due to the above-mentioned hard lock-up, and all cores in the core cluster may not operate usually. Here, a case where some cores in the core cluster operate unusually due to the above-mentioned hard lock-up will first be described.

In FIG. 6, the core of the hard lock-up state is detected (S210).

In FIG. 7, for example, the core 114 among the cores 112 and 114 of the first core cluster 110 is assumed to be the core of the locked-up state.

As shown in FIG. 7, the core 114 may execute an endless repetition code and enter a lock-up state, while moving the program counter PC from a third address ADDR to a fifth address ADDR at EL1 and executing the code CODE.

While moving the program counter PC from the first address ADDR to the tenth address ADDR at EL1 and executing the code CODE, when the program counter PC points to the tenth address ADDR, the core 112 may execute the debug client DEC1 to confirm that the core 114 is in the lock-up state and transmit an interrupt to the core 114. If the core 114 does not respond to the interrupt, the core 112 may detect the core 114 as being in the hard lock-up state.

Next, in FIG. 6, information about the core of the hard lock-up state is transmitted to the hypervisor (S212). In FIG. 7, the core 112 may execute the debug client DEC1 at EL1 to transmit information about the core 114 of the hard lock-up state to the hypervisor HV (S212).

Next, the core 112 executes the debug server DES at EL2, and detects that the core 114 of the first core cluster 110 is an unusual operation core (S200).

Here, an example is given in which the core 112 executes the debug server DES at EL2, but some implementations are not limited thereto, and the core 122 or 124 may execute the debug server DES at EL2 to detect that the core 114 is an unusual operation core. For example, all cores other than the unusual operation core may execute the debug server DES at EL2.

Next, in FIG. 5, the GPR value of the unusual operation core is stored (S300). Referring to FIG. 7, the core 112 may execute the debug server DES at EL2, and store the GPR value of the core 114 of the hard lock-up state in a separate storage space (S300). Here, the reason why the GPR value of the core 114 is stored in the separate storage space is to use the cause of the hard lock-up of the core 114 for future analysis. Since the GPR value of the core 114 will be modified depending on the operation of the core 114 in the future, in some implementations, the GPR value at the time when the core is in the hard lock-up state may be stored and used for future debugging.

Next, in FIG. 5, the debug client is called, while sending the address in which the GPR value is stored (S400). Referring to FIG. 7, since the core 114 is currently in the hard lock-up state, stack information of the core 114 (e.g., execution function stack information) is required for debugging. Accordingly, the core 112 executes the debug server DES at EL2 and controls the core 114, which is in the hard lock-up state, to execute the debug client DEC1 (S400).

For example, the core 112 executes the debug server DES at EL2, changes the program counter PC value to the address of the debug client DEC1 (e.g., the twelfth address ADDR) (changes the PC to 12 in this example), and may control the core 114 of the hard lock-up state to execute the debug client DEC1 (S400).

Next, in FIG. 5, the stack information and the GPR value of the unusual operation core are output (S500). Referring to FIG. 7, the core 114 executes the debug client DEC1 at EL1 to output the stack information of the core 114, and may output the stored GPR value, by referring to the address in which the provided GPR value is stored (S500).

In some implementations, the stack information and the GPR value of the core 114 may be output, for example through a display device or to a predetermined storage region, and may be used for future debugging of the core 114.

Next, in FIG. 5, the system is reset (S600). Referring to FIG. 7, the core 112 may execute the reset driver RD at EL2 to reset the system (S600). Accordingly, when the core 114 is in the hard lock-up state, because the core 114 is in a state of not receiving the interrupt, in the SoC that is not equipped with a separate debug subsystem, it is not easy to secure information about the hard lock-up state. When the system is reset to normalize the system in the state of not securing such information, because all types of related information will be initialized, it is difficult to analyze the cause of the hard lock-up.

However, in some implementations, the stack information and the GPR value of the core 114 that is in the hard lock-up state may be secured through the above-described configuration. This enables efficient debugging in virtualized environments without a separate debug subsystem.

Although some implementations have been described above in which some of the cores included in the first core cluster 110 are in the hard lock-up state, even when some of the cores included in the second core cluster 120 are in the hard lock-up state, the debugging may be performed through the same operation of the core 122 or the core 124.

Next, a debugging operation when all cores in the core cluster do not operate usually will be described with reference to FIG. 5 and FIGS. 8 to 10.

Figure 8:
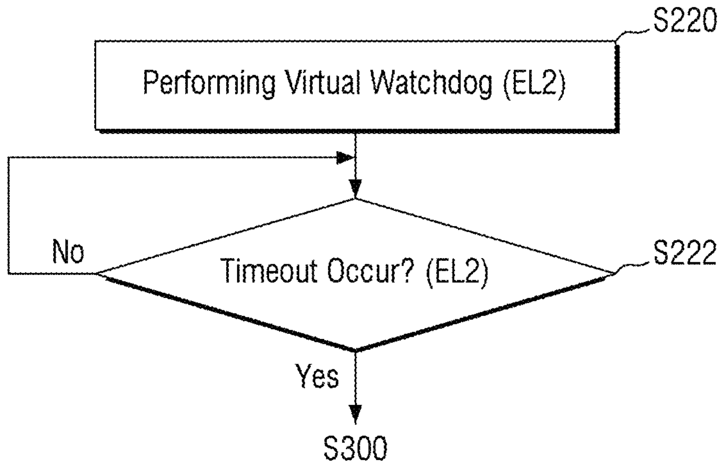
FIGS. 8 to 10 are diagrams for explaining the debugging operation of FIG. 5 according to some implementations.
Figure 9:
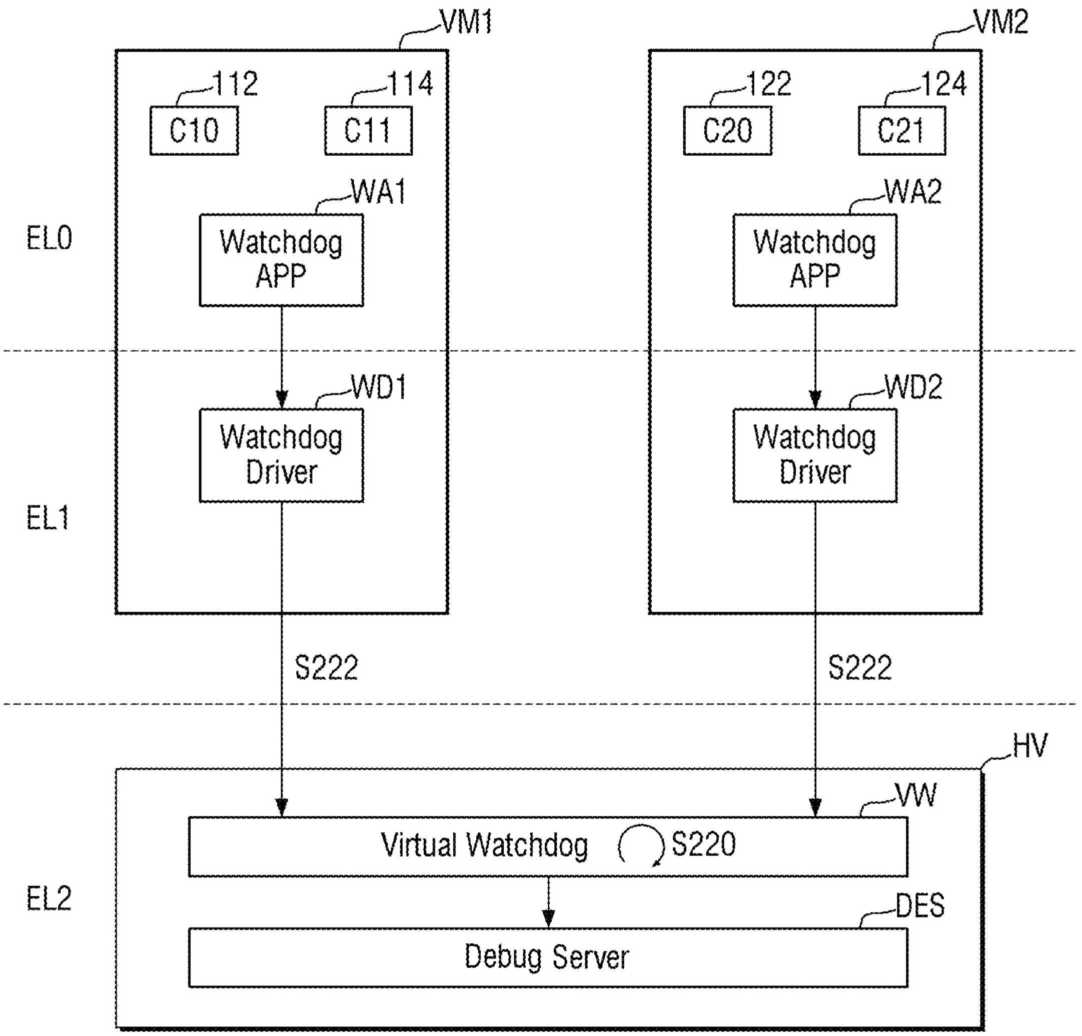
Figure 10:
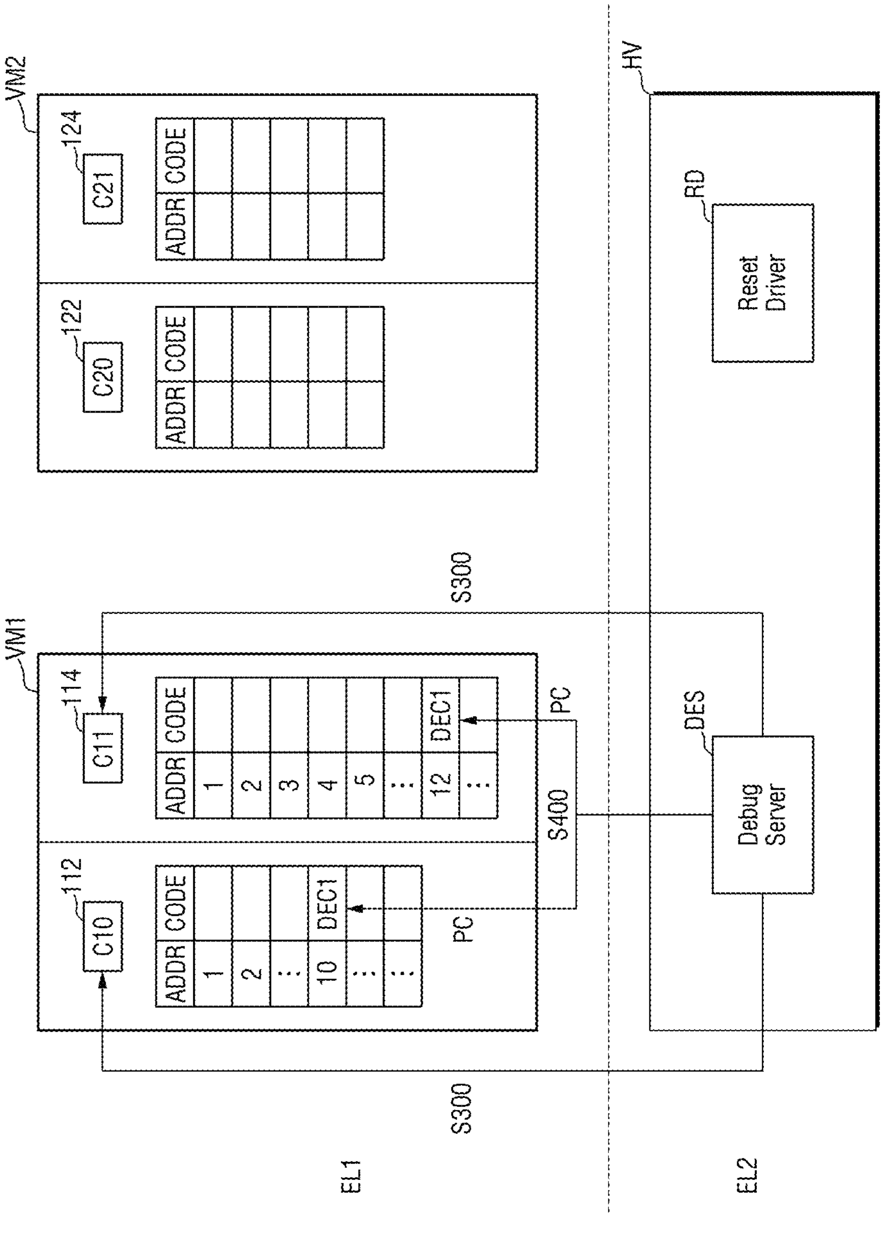

FIGS. 8 to 10 are diagrams for explaining the debugging operation of FIG. 5 according to some implementations. In FIG. 8, a virtual watchdog operation is performed (S220). If a timeout does not occur (S222—No), the virtual watchdog operation is continuously performed, and if a timeout occurs (S222—Yes), the cores of the core cluster from which the watchdog signal is not received are detected to be unusual operation cores, and the GPR values thereof are stored (S300 of FIG. 5).

In FIG. 9, the core 112 may execute the virtual watchdog driver VW at EL2 to perform the virtual watchdog operation of detecting the unusual operation of a plurality of cores included in the first core cluster 110 or the second core cluster 120 (S220).

Here, in some implementations, the core 112 executes the virtual watchdog driver VW at EL2, some implementations are not limited thereto, and the core 114, the core 122 or the core 124 may execute the virtual watchdog driver VW at EL2 to perform the virtual watchdog operation. For example, all the cores may execute the virtual watchdog driver VW at EL2.

In some implementations, the virtual watchdog operation checks whether the watchdog signal is received from the watchdog driver WD1 of the first virtual machine VM1 or the watchdog driver WD2 of the second virtual machine VM2 within a predetermined period of time. For example, at least one of the core 112 and the core 114 executes the watchdog application WA1 at EL0 to periodically generate a watchdog signal, and may execute the watchdog driver WD1 at EL1 to transmit the watch poison signal to the hypervisor HV. Further, at least one of the core 122 and the core 124 executes the watchdog application WA2 at EL0 to periodically generate the watchdog signal, and may execute the watchdog driver WD2 at EL1 to transmit the watchdog signal to the hypervisor HV. In some implementations, the watchdog applications WA1 and WA2 generate the watchdog signal, some implementations are not limited thereto, and an example may be modified and implemented so that the watchdog drivers WD1 and WD2 generate the watchdog signal.

The core 112 then executes the virtual watchdog driver VW at EL2 to check whether the watchdog signal is periodically received within a predetermined period of time. If the watchdog signal is received from the watchdog driver WD1 and the watchdog signal is received from the watchdog driver WD2 within a predetermined period of time, at least one of the cores in the first core cluster 110 is determined to perform the usual operation, and at least one of the cores in the second core cluster 120 is determined to perform the usual operation.

Incidentally, if the watchdog signal is received from the watchdog driver WD2 within a predetermined period of time, but no watchdog signal is received from the watchdog driver WD1, a timeout occurs. The timeout of this case means that at least one of the cores in the second core cluster 120 performs the usual operation, but all cores in the first core cluster 110 do not operate usually. Accordingly, all cores in the first core cluster 110 are detected as unusual operation cores, and the above-described debugging operation is performed.

In FIG. 10, for example, the core 122 may execute the debug server DES at EL2, and store the GPR values of the cores 112 and 114 included in the first core cluster 110 in a separate storage space (S300).

Next, in FIG. 5, the debug client is called, while sending the address in which the GPR value is stored (S400). Referring to FIG. 10, because the cores 112 and 114 are unusual operation cores in the current state, stack information of the cores 112 and 114 (e.g., execution function stack information) is required for debugging. Accordingly, the core 122 executes the debug server DES at EL2, and controls the core 112 and the core 114 to execute the debug client DEC1 (S400). For example, the core 122 executes the debug server DES at EL2, changes the program counter PC value to the address of the debug client DEC1 (in this example, changes PC to 10 for core 112, and changes PC to 12 for core 114), and may control each of the core 112 and the core 114 to execute the debug client DEC1 (S400).

Next, in FIG. 5, the stack information and the GPR value of the unusual operation core are output (S500). Referring to FIG. 10, the core 112 executes the debug client DEC1 at EL1 to output the stack information of the core 112, and may output the stored GPR value, by referring to the address in which the provided GPR value is stored. Further, the core 114 executes the debug client DEC1 at EL1 to output the stack information of the core 114, and may output the stored GPR value by referring to the address in which the provided GPR value is stored (S500).

In some implementations, the stack information and the GPR values of such cores 112 and 114 may be output, for example, through a display device or output to a predetermined storage region, and may be used for debugging of the core 112 and core 114 in the future.

Next, in FIG. 5, the system is reset (S600). Referring to FIG. 10, the core 122 may execute the reset driver RD at EL2 to reset the system (S600). Accordingly, even if all the cores included in the first core cluster 110 fail to operate usually, in some implementations, the stack information and the GPR value of the unusual operation cores may be secured through the above-described configuration. This enables efficient debugging in virtualized environments without a separate debug subsystem.

Although a case has been described above in which at least one of the cores in the second core cluster 120 executes a usual operation and all cores in the first core cluster 110 do not operate usually, even in a case where at least one of the cores in the second core cluster 120 performs the usual operation and all cores in the second core cluster 120 do not operate usually, the debugging operation may be performed via the similar procedure.

Figure 11:
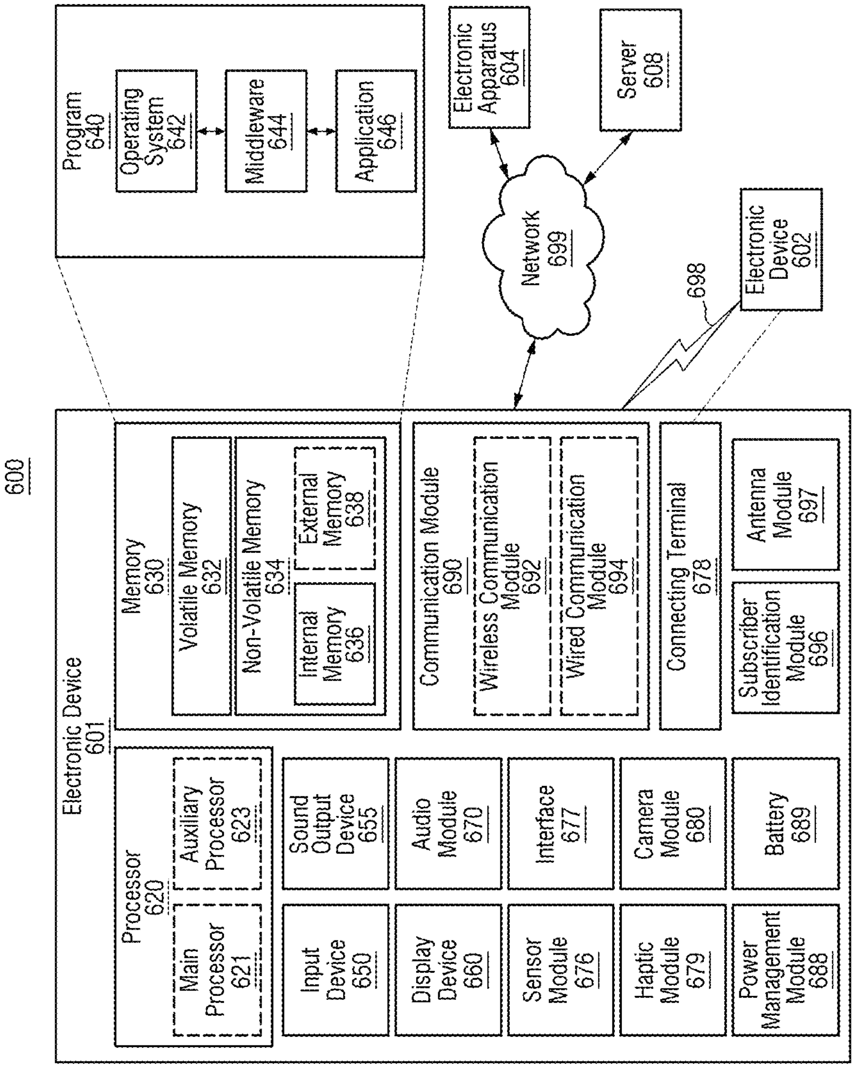
FIG. 11 is a block diagram of an example of an electronic device according to some implementations.

FIG. 11 is a block diagram of an example of an electronic device according to some implementations. In FIG. 11, an electronic device 601 in a network environment 600 may communicate with an electronic device 602, for example, through a first network 698, such as a short-range wireless network, or may communicate with an electronic device 604 or a server 608, for example, through a second network 699, such as a long-range wireless network. In some implementations, although the electronic device 601 may be, for example, a notebook computer, a laptop computer, a portable mobile terminal, and the like, some implementations are not limited thereto.

The electronic device 601 may communicate with the electronic device 604 through the server 608. The electronic device 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module (SIM) 696, an antenna module 697, and the like.

In some implementations, at least one of the components, for example, such as the display device 660 or the camera module 680, may be omitted from the electronic device 601, or one or more other components may be added to the electronic device.

In some implementations, some of the components may be implemented as a single integrated circuit (IC). For example, the sensor module 676, such as a fingerprint sensor, an iris sensor or an illuminance sensor, may be buried in an image display device, such as a display.

The processor 620 may execute software (e.g., program 640) for controlling other components of at least one electronic device 601, such as hardware or software component connected to the processor 620, thereby performing various date processing and computations.

As at least a part of data processing or computations, the processor 620 may load command or data received from other components, such as the sensor module 676 or the communication module 690, to a volatile memory 632, process the command or data stored in the volatile memory 632, and store the resultant data in a non-volatile memory 634.

The processor 620 may include, for example, a main processor 621 such as a central processing unit (CPU) or an application processor (AP), and an auxiliary processor 623 that operates independently of or together with the main processor 621.

Such an auxiliary processor 623 may include, for example, a graphic processing unit (GPU), an image signal processor (ISP), a sensor hub processor, a communication processor (CP) or the like.

In some implementations, the auxiliary processor 623 may be configured to consume less power than the main processor 621 or perform specific functions. The auxiliary processor 623 may be implemented separately from or as a part of the main processor 621.

The auxiliary processor 623 may control at least some of the functions or statuses associated with at least one component among the components of the electronic device 601, for example, on behalf of the main processor 621 while the main processor 621 is in an inactive status, or along with the main processor 621 while the main processor 621 is in an active status. In some implementations, the first core cluster (110 of FIG. 1) described above may perform the role of the main processor 621, and the second core cluster (120 of FIG. 1) may perform the role of the auxiliary processor 623.

The memory 630 may store various types of data used in at least one component of the electronic device 601. Various types of data may include, for example, input data or output data for software such as program 640, and commands associated with this. The memory 630 may include the volatile memory 632 and the non-volatile memory 634. The memory 630 may include the volatile memory 632 and the non-volatile memory 634. The non-volatile memory 634 may include an internal memory 636 and an external memory 638.

In some embodiments, the volatile memory 632 may include the memory device described above (230 of FIG. 1), and the non-volatile memory 634 may include the storage device described above (240 of FIG. 1).

The program 640 may be stored as software in the memory 630, and may include, for example, an operating system (OS) 642, a middleware 644 or an application 646.

The input device 650 may receive commands or data to be used in other components of the electronic device 601 from the outside of the electronic device 601. The input device 650 may include, for example, a microphone, a mouse or a keyboard.

The sound output device 655 may output a sound signal to the outside of the electronic device 601. The sound output device 655 may include, for example, a speaker. Multimedia data may be output through the speaker.

The image display device 660 may visually provide information to the outside of the electronic device 601. The image display device 660 may include, for example, a display, a hologram device or a projector, and a control circuit for controlling the corresponding one among the display, the hologram device or the projector.

In some implementations, the image display device 660 may include a touch circuit configured to detect the touch, or a sensor circuit, for example, such as a pressure sensor configured to measure strength of force caused by the touch.

The audio module 670 may convert the sound into an electrical signal or vice versa. In some implementations, the audio module 670 may obtain the sound through the input device 650 or may output the sound through the sound output device 655 or a headphone of the external electronic device 602 that is directly or wirelessly connected to the electronic device.

The sensor module 676 detects an operating status, such as power or temperature, of the electronic device 601 or an external environmental status, such as a user's status, and may generate an electrical signal or data value corresponding to the detected status. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The interface 677 may support one or more specified protocols that are used by the electronic device 601 directly or wirelessly to the external electronic device 602. In some implementations, the interface 677 may include, for example, a high resolution multimedia interface (HDMI), a universal serial bus (USB) interface, a secure digital (SD) card interface or an audio interface.

A connecting terminal 678 may include a connector through which the electronic device 601 may be physically connected to the external electronic device 602. In some implementations, the connecting terminal 678 may include, for example, an HDMI connector, a USB connector, an SD card connector or an audio connector (e.g., a headphone connector or the like).

The haptic module 679 may convert an electrical signal into a mechanical stimulus, for example, such as vibration or motion that may be perceived by the user through a tactile sensation or a kinesthetic sensation. In some implementations, the haptic module 679 may include, for example, a motor, a piezoelectric element or an electrical stimulator.

The camera module 680 may capture still images or moving images. In some implementations, the camera module 680 may include one or more lenses, an image sensor, an image signal processor, a flash, and the like.

The power management module 688 may manage the power to be supplied to the electronic device 601. The power management module 688 may be implemented, for example, as at least a part of a power management integrated circuit (PMIC).

The battery 689 may supply power to at least one component of the electronic device 601. According to some implementations, the battery 689 may include, for example, a non-rechargeable primary battery, a rechargeable secondary battery or a fuel cell.

The communication module 690 may support establishment of direct communication channel or wireless communication channel between the electronic device 601 and an external electronic device, for example, such as the electronic device 602, the electronic device 604 or the server 608, and may perform communication through the established communication channel.

The communication module 690 may include one or more communication processors that is operable independently of the processor 620 and supports a direct communication or a wireless communication.

In some implementations, the communication module 690 may include a wireless communication module 692, for example, such as a cellular communication module, a short-range wireless communication module or a global navigation satellite system (GNSS) communication module, or a wired communication module 694, for example, such as a local area network (LAN) communication module or a power line communication module (PLC).

Among these communication modules, the corresponding communication module may communicate with the external electronic device through the first network 698, for example, such as a Bluetooth™, a Wireless-Fidelity (WiFi) direct or a standard of the Infrared Data Association (IrDA) or the second network 699, for example, such as a cellular communication network, an Internet or a long-range communication network Various types of communication modules may be implemented as a single component or may be implemented as a plurality of components separated from each other. The wireless communication module 692 may verify and authenticate the electronic device 601 inside a communication network such as the first network 698 or the second network 699, for example, using subscriber information such as an international mobile subscriber identifier (IMSI) stored in the subscriber identification module 696.

In some implementations, the first core cluster (110 of FIG. 1) described above may perform the role of the processor 620, and the second core cluster (120 of FIG. 1) may perform the role of the communication module 690.

The antenna module 697 may transmit or receive signals or power to and from the outside of the electronic device 601. In some implementations, the antenna module 697 may include one or more antennas, and hence, at least one antenna which is suitable for communication scheme used in communication networks, such as the first network 698 or the second network 699, may be selected by the communication module 690. The signal or power may then be transmitted or received between the communication module and the external electronic device through at least one selected antenna.

At least some of the aforementioned components may be connected to each other to perform signal communication between them through an inter-peripheral communication scheme, for example, such as a general purpose input and output (GPIO), a serial peripheral interface (SPI) or a mobile industry processor interface (MIPI).

In some implementations, command or data may be transmitted or received between the electronic device 601 and the external electronic device 606 through the server 608 connected to the second network 699. Each of the electronic devices 602 and 606 may be devices which are the same type as or different type from of the electronic device 601. All or some of the operations to be executed in the electronic device 601 may be executed in one or more external electronic devices 602, 606 or 608. For example, all or some of the operations to be executed in the electronic device 601 may be performed in one or more external electronic devices 602, 606 or 608.

For example, if the electronic device 601 needs to perform the function or service automatically or in response to request from a user or other devices, the electronic device 601 that executes the function or service may require one or more external electronic devices to perform at least some of the function or service on behalf of this or additionally. One or more external electronic devices that receive the request may perform at least some of the requested function or service or additional functions or additional services associated with the request, and send the results of the execution to the electronic device 601. The electronic device 601 provides the results as at least part of the response to the request, with or without accompanying further processing of the results. For example, cloud computing, distributed computing or client-server computing techniques may be used for this purpose.

Figure 12:
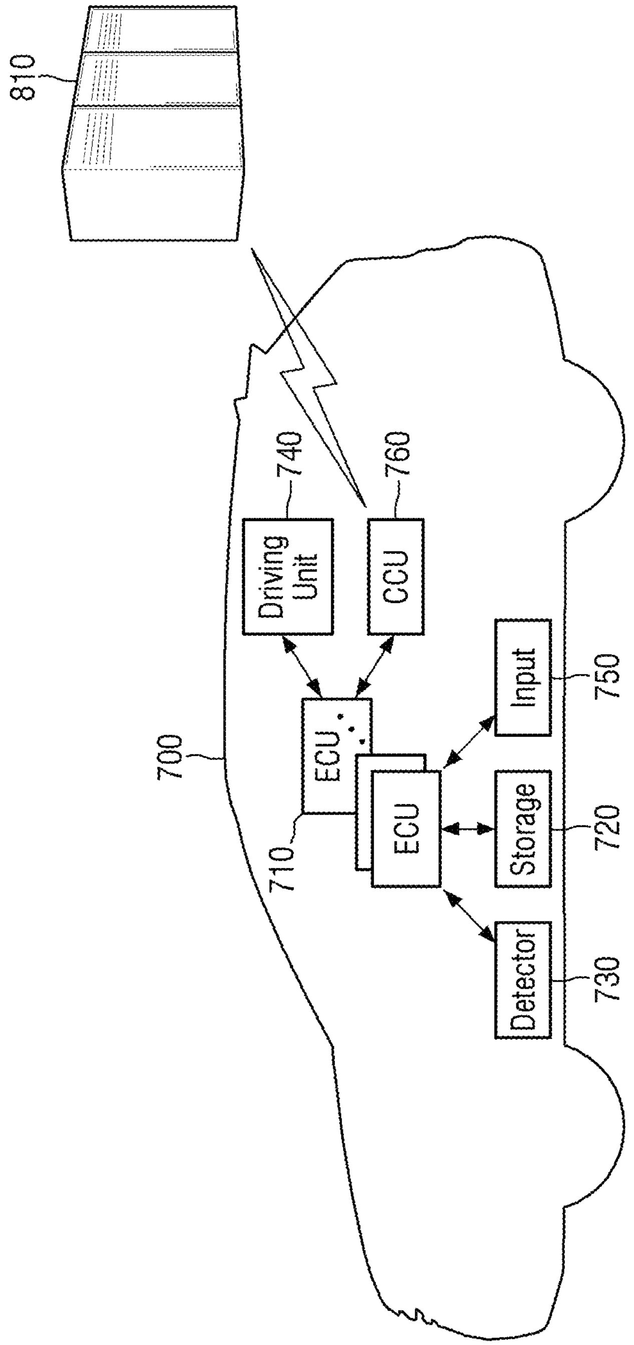
FIG. 12 is a diagram of a vehicle including an example of an electronic control unit according to some implementations.

FIG. 12 is a diagram of a vehicle including an example of an electronic control unit according to some implementations. In FIG. 12, a vehicle 700 may include a plurality of electronic control units (ECU) 710, and a memory storage device 720. Each electronic control unit of the plurality of electronic control units 710 is electrically, mechanically, and communicatively connected to at least one of the plurality of devices provided in the vehicle 700, and may control the operation of at least one device on the basis of any one function execution command.

In some implementations, the plurality of devices may include an acquiring device 730 that acquires an image necessary for performing at least one function, and a driving unit 740 that performs at least one function. For example, the acquiring device 730 may include various detection units and image acquisition units, and the driving unit 740 may include a fan and compressor of an air conditioner, a fan of a ventilation device, an engine and a motor of a power device, a motor of a steering device, a motor and a valve of a brake device, an opening/closing device of a door or a tailgate, and the like.

The plurality of electronic control units 710 may communicate with the acquiring device 730 and the driving unit 740 using, for example, at least one of an Ethernet, a low voltage differential signaling (LVDS) communication, and a local interconnect network (LIN) communication.

The plurality of electronic control units 710 determine whether there is a need to perform the function on the basis of the information acquired through the acquiring device 730, and when it is determined that there is a need to perform the function, the plurality of electronic control units 710 control the operation of the driving unit 740 that performs the function, and may control an amount of operation on the basis of the acquired information. At this time, the plurality of electronic control units 710 may store the acquired information in the storage device 720 or read and use the information stored in the storage device 720.

The plurality of electronic control units 710 are able to control the operation of the driving unit 740 that performs the function on the basis of the function execution command that is input through the input unit 750, and are also able to check a setting amount corresponding to the information that is input through the input unit 750 and control the operation of the driving unit 740 that performs the function on the basis of the checked setting amount. Each electronic control unit 710 may control any one function independently, or may control any one function in cooperation with other electronic control units. For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive navigation information, road image information, and distance information to obstacles in cooperation with the electronic control unit of the vehicle terminal, the electronic control unit of the image acquisition unit, and the electronic control unit of the collision prevention device, and may control the power device, the brake device, and the steering device using the received information, thereby performing the autonomous driving.

A connectivity control unit (CCU) 760 is electrically, mechanically, and communicatively connected to each of the plurality of electronic control units 710, and communicates with each of the plurality of electronic control units 710. In some implementations, the connectivity control unit 760 is able to directly communicate with a plurality of electronic control units 710 provided inside the vehicle, is able to communicate with an external server, and is also able to communicate with an external terminal through an interface. In some implementations, the connectivity control unit 760 is able to communicate with the plurality of electronic control units 710, and is able to communicate with a server 810, using an antenna (not shown) and a RF communication.

In some implementations, the connectivity control unit 760 may communicate with the server 810 by a wireless communication. For example, the wireless communication between the connectivity control unit 760 and the server 810 may be performed through various wireless communication methods such as a global System for Mobile Communication (GSM), a Code Division Multiple Access (CDMA), a Wideband Code Division Multiple Access (WCDMA), a universal mobile telecommunications system (UMTS), a Time Division Multiple Access (TDMA), a Long Term Evolution (LTE), and a New Radio (NR), in addition to a Wifi and a Wireless broadband.

In some implementations, the first core cluster (110 of FIG. 1) described above may be implemented as the electronic control unit 710, and the second core cluster (120 of FIG. 1) may be implemented as the connectivity control unit 760.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A system on chip comprising:

a first core cluster including a plurality of cores, the first core cluster being configured to execute a first virtual machine that includes a first debug client; and a second core cluster including a plurality of cores configured to execute a second virtual machine that includes a second debug client, wherein a first core of the first core cluster is configured to:

execute a hypervisor, which includes a reset driver and a debug server, at a first exception level and detect at least one first unusual operation core among the plurality of cores included in the first core cluster, execute the debug server at the first exception level and call the first debug client, in response to detection of the first unusual operation core, execute the first debug client at a second exception level different from the first exception level and output stack information of the first unusual operation core, and execute the reset driver at the first exception level and perform a system reset, and wherein a second core of the second core cluster is configured to:

execute the hypervisor at the first exception level and detect at least one second unusual operation core among the plurality of cores included in the second core cluster, execute the debug server at the first exception level and call the second debug client, in response to detection of the second unusual operation core, execute the second debug client at the second exception level and output stack information of the second unusual operation core, and execute the reset driver at the first exception level and perform the system reset.

2. The system on chip of claim 1, wherein the first core cluster includes the first core and a third core, and wherein the first core is configured to execute the first debug client at the second exception level to confirm that the third core is in a hard lock-up state and send debugging information thereof to the hypervisor.

3. The system on chip of claim 2, wherein the first core is configured to execute the debug server at the first exception level in response to the third core being the first unusual operation core, and wherein the third core is configured to execute the first debug client at the second exception level so that stack information of the third core is output.

4. The system on chip of claim 1, wherein the first virtual machine further includes a first watchdog driver, wherein the hypervisor further includes a virtual watchdog driver, and wherein the first core is configured to:

execute the virtual watchdog driver at the first exception level, and perform a virtual watchdog operation of detecting unusual operations of the plurality of cores included in the first core cluster, execute the first watchdog driver at the second exception level, and transmit a first watchdog signal to the virtual watchdog driver within a predetermined period of time, and execute the virtual watchdog driver at the first exception level, and detect the first unusual operation core based upon a watchdog timeout in which the first watchdog signal is not received within the predetermined period of time.

5. The system on chip of claim 4, wherein the first core is configured to execute the debug server at the first exception level, and call the first debug client in response to the watchdog timeout.

6. The system on chip of claim 4, wherein the second virtual machine further includes a second watchdog driver, and wherein the second core is configured to:

execute the virtual watchdog driver at the first exception level, and perform a virtual watchdog operation of detecting unusual operations of the plurality of cores included in the second core cluster, execute the second watchdog driver at the second exception level, and transmit a second watchdog signal to the virtual watchdog driver within a predetermined period of time, and execute the virtual watchdog driver at the first exception level, and detect the second unusual operation core based upon a watchdog timeout in which the second watchdog signal is not received within the predetermined period of time.

7. The system on chip of claim 1, wherein the first core is configured to execute the first debug client at the second exception level and output a General Purpose Register (GPR) value of the first unusual operation core in response to detection of the first unusual operation core.

8. The system on chip of claim 7, wherein, in response to detection of the first unusual operation core, the first core is configured to execute the debug server at the first exception level to send an address, at which the GPR value of the first unusual operation core is stored, to the first debug client, and execute the first debug client at the second exception level to output the GPR value of the first unusual operation core.

9. The system on chip of claim 1, wherein the first virtual machine includes a first Operating System (OS), and wherein the second virtual machine includes a second OS different from the first OS.

10. The system on chip of claim 1, wherein the first core cluster is configured to execute the first virtual machine and operate as an Application Processor (AP), and wherein the second core cluster is configured to execute the second virtual machine and operate as a Communication Processor (CP).

11. The system on chip of claim 1, wherein the first exception level includes an EL2 of ARM v8 architecture, and the second exception level includes an EL1 of ARM v8 architecture.

12. An electronic device comprising:

a memory onto which a first virtual machine including a first debug client, a second virtual machine including a second debug client, and a hypervisor including a reset driver and a debug server are loaded; and a system on chip comprising a first core cluster having a first plurality of cores configured to execute the first virtual machine loaded onto the memory, and a second core cluster having a second plurality of cores configured to execute the second virtual machine loaded onto the memory, wherein a first core of the first core cluster is configured to:

execute the hypervisor at a first exception level and detect at least one first unusual operation core among the first plurality of cores included in the first core cluster, execute the debug server at the first exception level and call the first debug client, in response to detection of the first unusual operation core, execute the first debug client at a second exception level different from the first exception level and output a General Purpose Register (GPR) value and stack information of the first unusual operation core, and execute the reset driver at the first exception level and perform a system reset.

13. The electronic device of claim 12, wherein, in response to detection of the first unusual operation core, the first core is configured to execute the debug server at the first exception level to send an address, at which the GPR value of the first unusual operation core is stored, to the first debug client, and execute the first debug client at the second exception level to output the GPR value of the first unusual operation core.

14. The electronic device of claim 12, wherein the first core cluster includes the first core and a second core, and wherein the first core is configured to execute the first debug client at the second exception level to confirm that the second core is in a hard lock-up state and send information associated with the hard lock-up state to the hypervisor.

15. The electronic device of claim 14, wherein the first core is configured to execute the debug server at the first exception level in response to the second core being the first unusual operation core, and the second core is configured to execute the first debug client at the second exception level so that stack information of the second core is output.

16. The electronic device of claim 12, wherein the first virtual machine further includes a first watchdog driver, wherein the hypervisor further includes a virtual watchdog driver, and wherein the first core is configured to:

execute the virtual watchdog driver at the first exception level, and perform a virtual watchdog operation of detecting unusual operations of the first plurality of cores included in the first core cluster, execute the first watchdog driver at the second exception level, and transmit a first watchdog signal to the virtual watchdog driver within a predetermined period of time, and execute the virtual watchdog driver at the first exception level, and detect the first unusual operation core based upon a watchdog timeout in which the first watchdog signal is not received within the predetermined period of time.

17. The electronic device of claim 16, wherein the first core is configured to execute the debug server at the first exception level, and call the first debug client in response to the watchdog timeout.

18. The electronic device of claim 12, wherein a second core of the second core cluster is configured to:

execute the hypervisor at the first exception level and detect at least one second unusual operation core among the second plurality of cores included in the second core cluster, execute the debug server at the first exception level and call the second debug client in response to detection of the second unusual operation core, execute the second debug client at the second exception level and output a GPR value and stack information of the second unusual operation core, and execute the reset driver at the first exception level and perform the system reset.

19. An electronic device comprising:

a memory onto which a virtual machine including a debug client, and a hypervisor including a reset driver and a debug server are loaded; and a system on a chip comprising a plurality of cores configured to execute the hypervisor and the virtual machine loaded onto the memory, wherein a first core among the plurality of cores is configured to:

execute the hypervisor at a first exception level, and set up the reset driver and debug server, execute the virtual machine at a second exception level different from the first exception level, and set up the debug client, execute the hypervisor at the first exception level, and detect at least one unusual operation core among the plurality of cores, execute the debug server at the first exception level and call the debug client, in response to detection of the at least one unusual operation core, execute the debug client at the second exception level and output stack information of the at least one unusual operation core, and execute the reset driver at the first exception level and perform a system reset.

20. The electronic device of claim 19, wherein the first core is configured to execute the debug client at the second exception level and output a General Purpose Register (GPR) value of the at least one unusual operation core, in response to detection of the at least one unusual operation core.

* * * * *